Dec. 2, 1969   P. GERMOND ET AL   3,481,833
NUCLEAR REACTOR CONTROL ROD
Filed Aug. 29, 1967   3 Sheets-Sheet 3

3,481,833
NUCLEAR REACTOR CONTROL ROD
Philippe Germond, Fresnes, and Gérard Dupuy, Paris, France, assignors to Commissariat a l'Energie Atomique, Paris, France
Filed Aug. 29, 1967, Ser. No. 664,174
Claims priority, application France, Sept. 16, 1966, 76,733
Int. Cl. G21c 7/10
U.S. Cl. 176—86                 6 Claims

ABSTRACT OF THE DISCLOSURE

A nuclear reactor control rod comprises a tubular structure, a plurality of fuel elements supported by said structure and at least one tubular casing housed in said structure supporting a plurality of cobalt plates. Each tubular casing comprises two coaxial elements arranged respectively as an inner element and outer element of substantially square cross-sectional configuration. An annular space between said elements receives a plurality of cobalt plates.

---

This invention relates to control rods which are employed in the operation of nuclear reactors, and especially reactors of the swimming-pool type.

As is well known, control rods have already been designed so that one of their constituent materials can be utilized after irradiation for the production of radio-elements.

In fact, control rods of this type contain as neutron-absorbing materials cobalt grains which are approximately 1 millimeter in diameter and which are pressed between two aluminum plates.

After irradiation, the composite plates thus obtained are subjected to chemical processing for the purpose of separating the cobalt from the aluminum. The advantage of this type of control rod lies in the fact that it performs a double function, namely that of in-pile neutron absorption and out-of-pile production of radio-elements after irradiation. Conversely, a disadvantage arises from the fact that, in order to permit the recovery of the irradiated cobalt, the chemical processing entailed is both time-consuming and costly.

The primary object of the present invention is to circumvent the disadvantages attached to control rods of the type referred-to.

Accordingly, the invention is concerned with a nuclear reactor control rod which is characterized in that it comprises a tubular structure, a plurality of fuel elements supported by said structure and at least one tubular casing housed in said structure and adapted to support a plurality of cobalt plates clad with stainless steel.

In accordance with a characteristic feature of the invention, each tubular casing comprises two coaxial elements arranged respectively as an inner element and outer element and having a substantially square cross-sectional configuration, there being formed between said elements an annular space in which the cobalt plates are contained.

According to another feature of the invention, each casing element is joined to the other casing element by temporary fastening means.

The invention also extends to the following features which will be described hereinafter and to the different possible combinations thereof.

A control rod according to the invention is shown by way of non-limitative example in the accompanying drawings, in which.

Figures 1, 2:
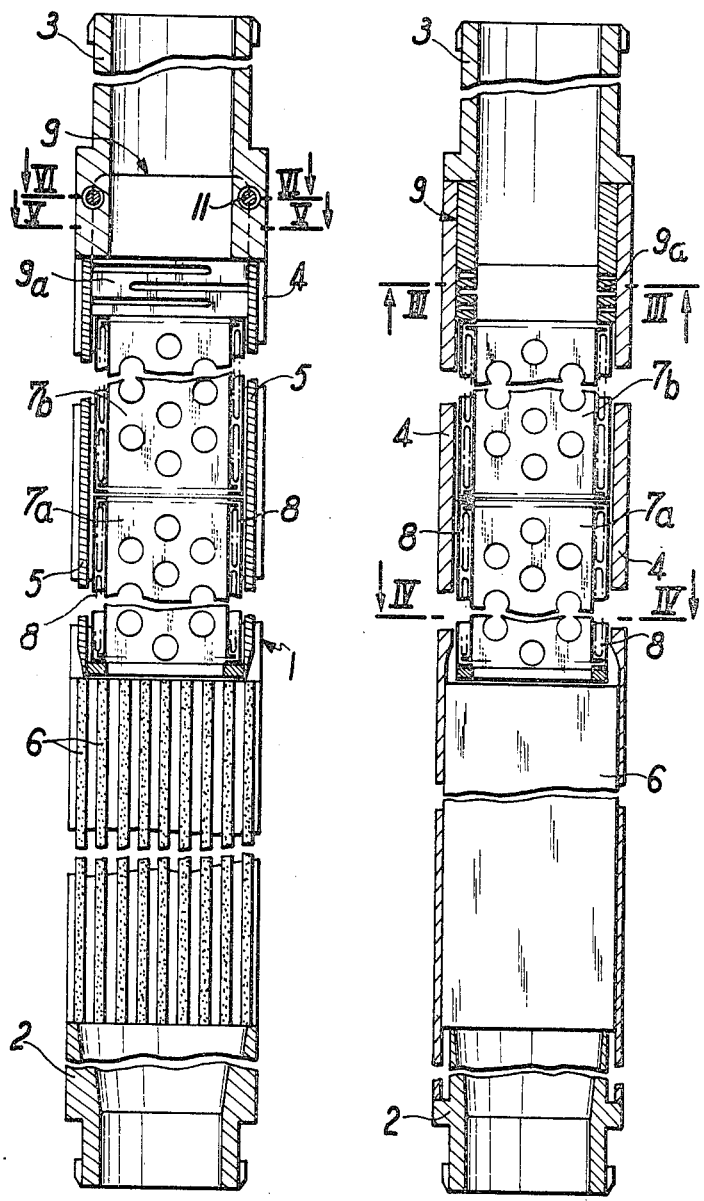
FIG. 1 is a view in elevation and in axial cross-section showing a control rod in accordance with the invention.
FIG. 2 is a top view in axial cross-section showing the control rod of FIG. 1.
Figure 3:
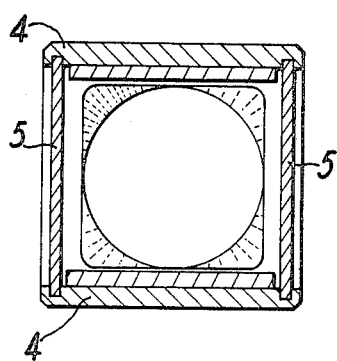
FIG. 3 is a left-hand view in cross-section taken along the line III—III of FIG. 2.
Figure 4:
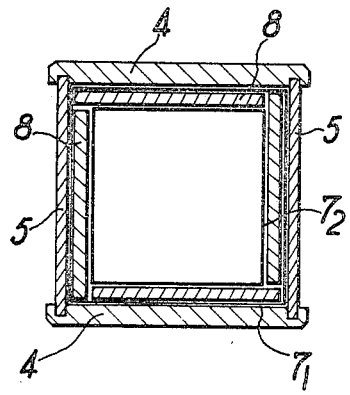
FIG. 4 is a right-hand view in cross-section taken along the line IV—IV of FIG. 2.
Figure 5:
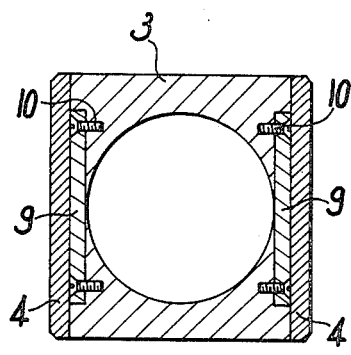
FIG. 5 is a right-hand view in cross-section taken along the line V—V of FIG. 1.
Figure 6:
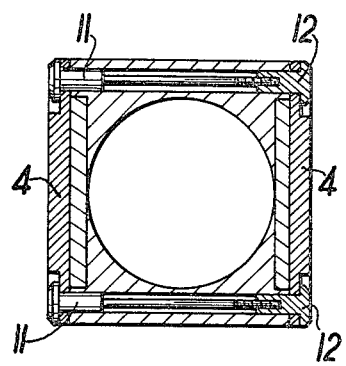
FIG. 6 is a view in cross-section taken along the line VI—VI of FIG. 1.

The control rod in accordance with the invention as shown in FIGS. 1 to 8 essentially comprises a tubular structure 1 having a generally square cross-section and comprising a lower end connector 2, an upper end connector 3, two side-plates 4 which extend between the end connectors and two distance-plates 5 which are inset between the side-plates 4.

Plate-type fuel elements 6 are fitted in the structure 1 in the vicinity of the lower end connector 2 and two adjacent casings 7a and 7b are mounted above said fuel elements. Each casing contains a plurality of small plates 8 of cobalt, each plate being clad with stainless steel or any other corrosion-resistant material.

Figure 7:
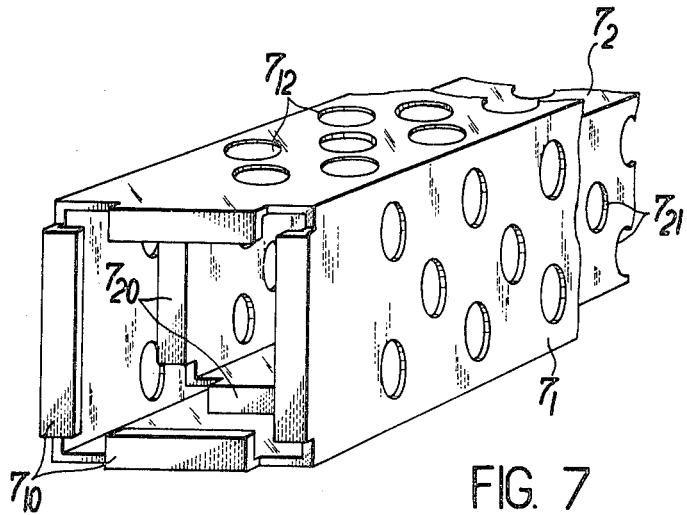
FIG. 7 is a view in perspective showing the elements of a tubular casing of the control rod of FIGS. 1 to 6.
Figure 8:
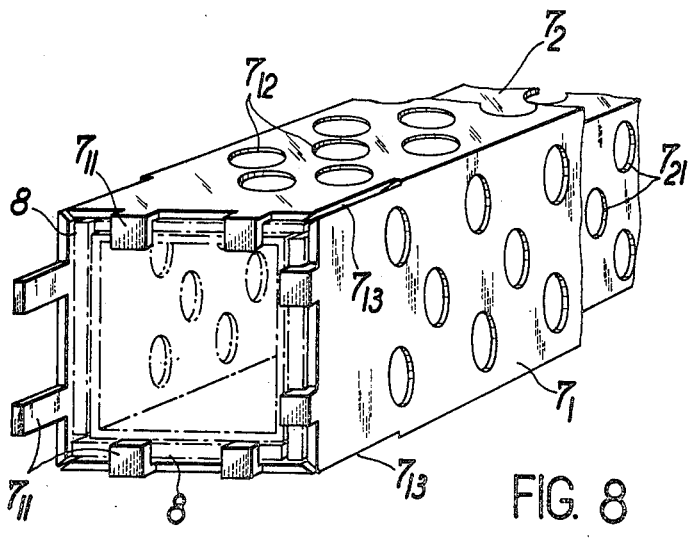
FIG. 8 is a view in perspective showing the elements of the casing of FIG. 7, and looking on the end opposite to the end which is presented in FIG. 7.

Each casing 7 (as shown in FIGS. 7 and 8) comprises an outer element $7_1$ and an inner element $7_2$ having a cross-section which is slightly smaller than the first. Both elements $7_1$ and $7_2$ are of generally parallelepipedal shape and of substantially square cross-section and are provided with means whereby they can be assembled temporarily so as to form between them an annular space of sufficient size to ensure that each of the four spaces located between the opposite faces of the casing elements is capable of accommodating a stack of cobalt plates 8 clad with stainless steel.

Right-angled flanges $7_{20}$ are formed at one end of the inner casing element $7_2$ by cutting-out and folding-back the ends of the walls of said element. Similarly, flanges $7_{10}$ located at right angles to the main faces of the outer element $7_1$ are formed at one end of said outer element by cutting-out and folding-back the ends of the walls of this latter. It is apparent from a study of FIG. 7 that the cooperation of the flanges $7_{20}$ of the inner element $7_2$ with the flanges $7_{10}$ of the outer element $7_1$ prevents the inner element from escaping from the outer element while additionally defining an annular space between said elements.

As is shown in detail in FIG. 8, the end of the outer element $7_1$ which is remote from the flanges $7_{10}$ is provided with a plurality of closure tongues $7_{11}$ formed by cutting-out and bending the ends of the walls of said element, the length of each tongue being greater than that of the space formed between the opposite faces of the inner and outer elements of the casing. The closure tongues $7_{11}$ referred-to, some of which are shown as being straight and others as being folded back make it possible to secure the two casing elements in a temporary manner and to hold the cobalt plates 8 within the free space which is formed between said casing elements.

As is shown in the drawings, the walls of the inner element $7_2$ and outer element $7_1$ of each casing 7 are provided with a plurality of holes respectively designated by the references $7_{21}$ and $7_{12}$ so as to permit the free circulation of a heat-transporting fluid inside each casing and around the cobalt plates. In addition, at that end of each outer casing element which is provided with tongues $7_{11}$, provision is also made for recesses $7_{13}$, each recess being cut in the corner which is formed between two adjacent walls, the function of said recesses being to permit the disassembly of each casing by pulling away each wall of the outer casing element in turn.

The casings 7a and 7b are maintained within the structure 1 of the neutron-absorbing rod by means of a clamping plug 9, one portion 9a of which is in the form of a spring. The plug 9 is attached by means of screws 10 to the upper end connector 3 of the control rod, said end-connector being in turn attached, although in a temporary manner, to the side-plates of the structure 1 by means of two threaded rods 11 which are adapted to cooperate with tubular nuts 12. The outer shape of the head of the threaded rods and nuts is such that these latter can readily be manipulated under water.

At the time of assembly of the control rod in accordance with the invention, each casing is first assembled by inserting an inner element within the corresponding outer element, by placing a plurality of cobalt plates in the space which is formed between the two casing elements and by closing the tongues 7 so as to effect the temporary interlocking of the casing elements. In order to facilitate the loading of each casing, an advantageous procedure consists in placing the cobalt plates in position progressively as the inner casing element is being introduced within the outer element.

After the casings have been introduced within the structure and the plug 9 has been placed in position and attached to the upper end connector 3, said end connector is in turn secured to the side-plates of the structure 1 by means of the threaded rods and tubular nuts 11–12.

In order to remove the cobalt plates after irradiation of the complete control rod assembly, each casing is first withdrawn from the control rod structure. To this end, it is possible either to reverse the control rod or to make use of a rubber hand which comes into frictional contact and thus engages the casing so as to withdraw this latter. The tongues which serve to close the casing are then straightened and its outer walls drawn outwards in much the same manner as peeling a banana (pulling-away of the walls being facilitated by the recesses formed at the corners of the outer element as stated earlier). The first cobalt plates then fall out or can readily be released by withdrawing the inner casing element.

By inserting a pin through the holes of the inner casing element, it is then possible to free said inner element from the outer element, thus releasing the cobalt plates contained between said elements.

What we claim is:

1. A nuclear reactor control rod comprising a tubular structure, a plurality of fuel elements supported axially in said structure, at least one tubular casing axially disposed in said structure and axially spaced from said fuel elements, a plurality of cobalt plates supported by said tubular casing, each tubular casing comprising two coaxial casing elements arranged respectively as an inner casing element and an outer casing element, said casing elements being substantially square in cross-section, an annular space between said casing elements, said cobalt elements being disposed in said space, and fastening means for joining each of said casing elements to the other of said casing elements.

2. A control rod as described in claim 1, said fastening means comprising inwardly turned flanges at the ends of said outer casing element.

3. A control rod as described in claim 1, said inner casing element having a plurality of out-turned flanges at an end thereof spacing said inner element from said outer element.

4. A control rod as described in claim 2, said flanges of said outer casing element including at one end thereof a plurality of closure tongues, each tongue being turned inwards at right angles and spanning said space.

5. A control rod as described in claim 1, each of said casing elements being perforated for free circulation of a heat transporting fluid around said cobalt plates in said casing.

6. A control rod as described in claim 1, said tubular structure comprising a lower end connector, an upper end connector, two side plates extending between said end connectors, two spacing plates joining said side plates, a clamping plug in said tubular structure secured to said upper end connector holding said tubular casing in said tubular structure and a spring mounted between said plug and said tubular casing.

References Cited

UNITED STATES PATENTS

| 2,841,545 | 7/1958 | Zinn | 176—68 |
| 2,952,600 | 9/1960 | Newson | 176—86 |
| 3,049,484 | 8/1962 | Zinn | 176—68 |
| 3,122,484 | 2/1964 | Iskenderian | 176—68 |
| 3,361,639 | 1/1968 | Ashcroft et al. | 176—68 |
| 3,335,064 | 8/1967 | Whittaker et al. | 176—86 |

FOREIGN PATENTS 1,403,767   5/1965   France.

CARL D. QUARFORTH, Primary Examiner

HARVEY E. BEHREND, Assistant Examiner

U.S. Cl. X.R.

176—15, 68